(12) United States Patent
Chavdar et al.

(10) Patent No.: US 8,939,269 B2
(45) Date of Patent: Jan. 27, 2015

(54) SEGMENTED FRICTION MATERIAL FOR CLUTCHES

(75) Inventors: Bulent Chavdar, Rochester Hills, MI (US); Scott T. Roth, Auburn Hills, MI (US)

(73) Assignee: Eaton Corporation, Cleveland, OH (US)

( * ) Notice: Subject to any disclaimer, the term of this patent is extended or adjusted under 35 U.S.C. 154(b) by 144 days.

(21) Appl. No.: 13/328,159

(22) Filed: Dec. 16, 2011

(65) Prior Publication Data

US 2013/0153358 A1 Jun. 20, 2013

(51) Int. Cl.
*F16D 13/64* (2006.01)
*F16D 13/72* (2006.01)

(52) U.S. Cl.
USPC ............... 192/70.12; 192/70.14; 192/113.36; 192/107 R; 192/107 M

(58) Field of Classification Search
USPC ............... 192/70.12, 70.13, 113.3, 113.34, 192/113.35, 113.36, 70.14, 107 R; 188/218 XL See application file for complete search history.

(56) References Cited

U.S. PATENT DOCUMENTS

| | | | | |
|---|---|---|---|---|
| 2,690,248 | A * | 9/1954 | McDowall | 192/113.36 |
| 3,231,058 | A * | 1/1966 | Batchelor et al. | 192/107 R |
| 4,747,473 | A | 5/1988 | Bok et al. | |
| 5,094,331 | A * | 3/1992 | Fujimoto et al. | 192/70.12 |
| 5,460,255 | A | 10/1995 | Quigley | |
| 5,709,288 | A * | 1/1998 | Riebe | 188/218 XL |
| 5,713,450 | A | 2/1998 | Quigley | |
| 6,019,205 | A * | 2/2000 | Willwerth et al. | 192/107 R |
| 6,345,711 | B1 | 2/2002 | Sullivan | |
| 6,712,190 | B2 | 3/2004 | Kitaori et al. | |
| 7,249,663 | B2 | 7/2007 | Mordukhovich et al. | |
| 7,789,209 | B2 * | 9/2010 | Miyazaki et al. | 192/70.12 |
| 2004/0074733 | A1 * | 4/2004 | Suzuki et al. | 192/107 R |
| 2004/0079595 | A1 | 4/2004 | Fabricius et al. | |
| 2007/0017769 | A1 * | 1/2007 | Mordukhovich et al. | 192/70.12 |
| 2007/0193847 | A1 | 8/2007 | Keating et al. | |
| 2008/0179161 | A1 | 7/2008 | Kobayashi et al. | |
| 2008/0302625 | A1 | 12/2008 | Takayanagi | |
| 2009/0050434 | A1 * | 2/2009 | Okamura et al. | 192/113.36 |
| 2009/0053475 | A1 * | 2/2009 | Higashijima et al. | 428/172 |

FOREIGN PATENT DOCUMENTS

KR 10-2011-0011072 A 2/2011

OTHER PUBLICATIONS

Korean Intellectual Property Office; International Search Report and Written Opinion issued in corresponding International Application No. PCT/US2012/070130. Date of Mailing: Apr. 19, 2013.

* cited by examiner

*Primary Examiner* — Troy Chambers
*Assistant Examiner* — Lillian Nguyen
(74) *Attorney, Agent, or Firm* — Dykema Gossett PLLC

(57) ABSTRACT

A friction plate for a clutch assembly includes a core plate and a plurality of friction segments made of a friction material. A plurality of grooves are disposed between said plurality of friction segments. Each segment has tapered sides so that the grooves have a first width adjacent the outer diameter of the core plate and a smaller second width smaller adjacent the inner diameter of the core plate. This tapered groove structure directs oil from the outside the clutch assembly to the inside to improve cooling efficiency.

18 Claims, 3 Drawing Sheets

US 8,939,269 B2

SEGMENTED FRICTION MATERIAL FOR CLUTCHES

TECHNICAL FIELD

The present teachings relate to friction material for clutches, and more particularly to a friction material having a configuration suitable for wet clutch applications.

BACKGROUND

The present teachings generally relate to a friction material that can be used in clutch applications, such as a multi-plate wet clutch pack in a limited slip differential system. Friction plates and the friction material on the plates affect the reliability and quality of clutch engagement.

When wet clutches engage and slide against each other, the contacting friction surfaces generate heat. Oil can be applied to the friction plates to cool the contacting components, either by center-fed forced cooling (where oil is pumped through channels in the center of an input shaft and exits through holes in the center of a clutch hub to flow into the clutch pack) or splash cooling (where a differential housing is filled with oil that splashes on the clutch plates). Forced cooling systems allow adjustment of the oil flow rate based on the cooling demand, but incorporating the pump and fluid channels adds complexity to the differential system.

By contrast, splash cooling is a passive cooling method and does not require any special modifications to the differential system. However, the clutch packs in LSD systems are always engaged (e.g., adjacent friction plates and separator plates are always in contact with each other). This makes it difficult for sufficient oil to reach the clutch interface and cool the clutch. In other words, splash-cooled wet clutches tend to have low cooling efficiency.

SUMMARY

One aspect of the present teachings is directed to a friction plate for a clutch assembly. The friction plate comprises a core plate having an inner diameter and a first outer diameter and a plurality of friction segments made of a friction material. A plurality of grooves are disposed between said plurality of friction segments, wherein each segment has tapered sides so that the grooves have a first width adjacent the first outer diameter and a second width, which is smaller than the first width, adjacent the inner diameter.

Another aspect of the present teachings is directed to a clutch assembly having a plurality of the friction plates described above disposed in an alternating fashion with a plurality of separator plates.

DETAILED DESCRIPTION

Figure 1:
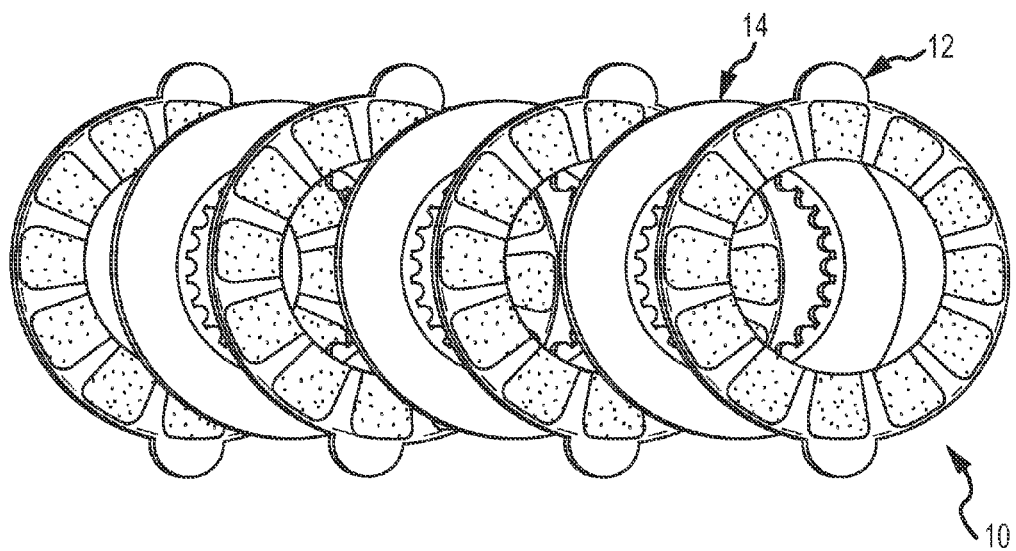
FIG. 1 is an exploded view of a wet clutch pack according to one aspect of the teachings.

FIG. 1 illustrates components in a wet clutch 10 according to one aspect of the teachings. The wet clutch 10 can include friction plates 12 and separator plates 14 arranged in an alternating manner.

Figure 2A:
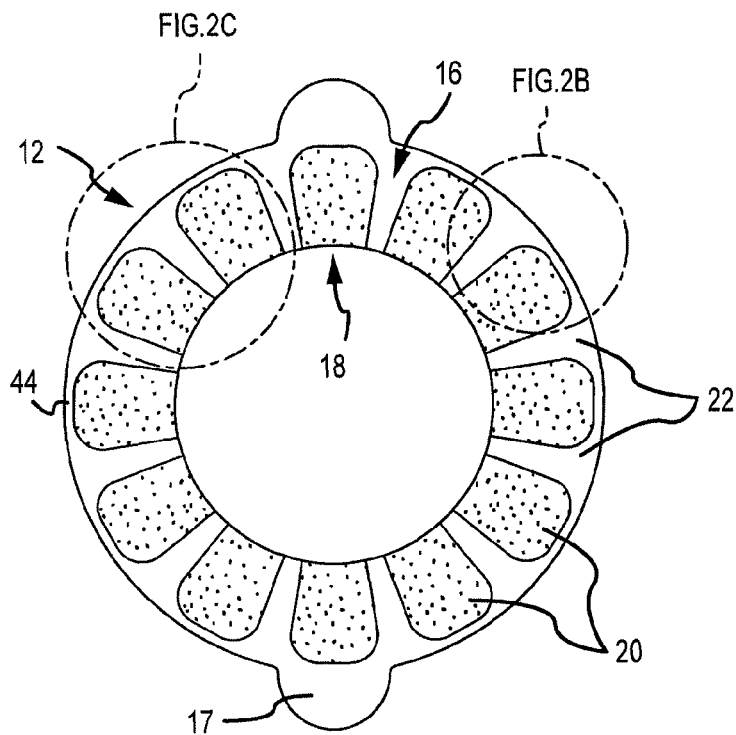
FIG. 2A is a plan view of a friction plate that can be used in the system of FIG. 1.
Figure 2B:
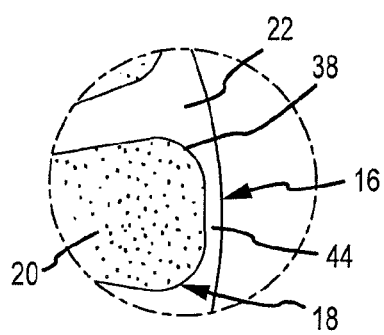
FIG. 2B is a close-up view of the friction plate in FIG. 2A.
Figure 2C:
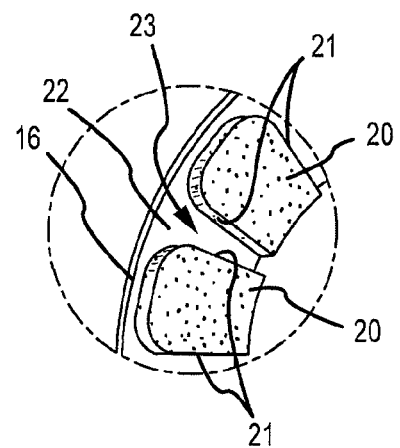
FIG. 2C is a close-up perspective view of the friction plate in FIG. 2A.

As shown in FIGS. 2A, 2B, and 2C, the friction plate 12 can include a core plate 16 and a friction lining 18 bonded to the core plate 16 via any known process. The separator plate 14 and the core plate 16 may both be made of steel. The core plate 16 may have ears 17 to act as clutch guides.

The friction lining 18 can be formed as a plurality of segments 20 with side surfaces 21 forming grooves 22 in between the segments 20. The friction lining 18 may be formed of any appropriate material, such as a paper-based friction material containing aramid or other high-strength fibers and fillers and saturated with a thermosetting resin, such as a phenolic resin. Options for the friction material structure include woven, pultruded or compression-molded structures. Options for the friction material itself may include polyamide, carbon, ceramic, or any combination thereof. These options are only examples: the specific material and material structure is not critical to the teachings, and those of ordinary skill in the art will recognize that other options are within the scope of the teachings.

Grooves 22 act as fluid paths to allow oil to flow between the friction plates 12 and separator plates 14 for cooling. Deeper grooves 22 improve cooling efficiency and reduces thermal degradation of the friction lining 18 because deeper grooves 22 allow more cooling oil to circulate between the plates 12, 14. The grooves 22 can be made in various ways, such as molding grooves into the friction lining 18 or cutting the friction lining 18 to form the grooves 22. Cutting or machining allows formation of deeper grooves 22 (i.e., thicker side surfaces 21) than molding and therefore can potentially improve the cooling efficiency of the wet clutch 10. However, cutting the friction lining 18 material can create fuzziness and loose fibers at the cut edges due to fibers in the friction lining 18 material. The fuzzy edges can restrict oil flow, and the loose fibers can contaminate the oil.

Figure 3:
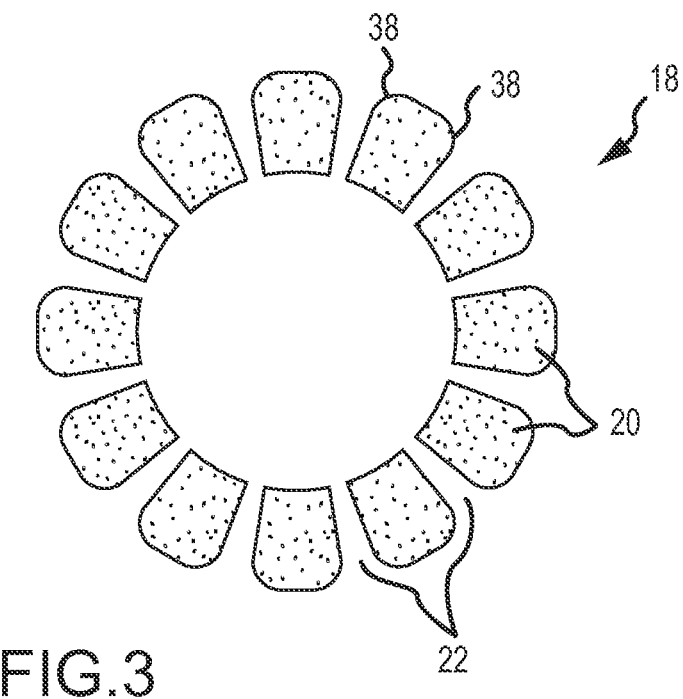
FIG. 3 is a plan view of friction material that can be used in the friction plate of FIG. 2.

The friction lining 18 shown in FIGS. 1 through 3 solves the above problems by dividing the friction lining 18 into discrete segments 20. Creating separate segments 20 maximizes the depth of the grooves 22 and provides smooth side surfaces 21 that do not impede oil flow.

The number and shape of the segments 20 as well as the direction (e.g., radial vs. angled), width, and shape of the grooves 22 all affect the cooling efficiency of the wet clutch 10 and control the amount of thermal degradation in the friction lining 18. For example, if the segments 20 are too large, there will be fewer grooves 22, thereby reducing the amount of oil circulating through the wet clutch 10, diminishing cooling efficiency, and increasing thermal degradation of the friction lining 18. However, if there are too many segments 20 and grooves 22, the increased number of grooves 22 reduces the load capacity of the wet clutch 10 by reducing the land area of the friction lining 18, thereby increasing the amount of friction load each segment 20 must bear. This can potentially increase the wear rate of the friction lining 18 and reduce its compression fatigue life and reliability.

Figure 4:
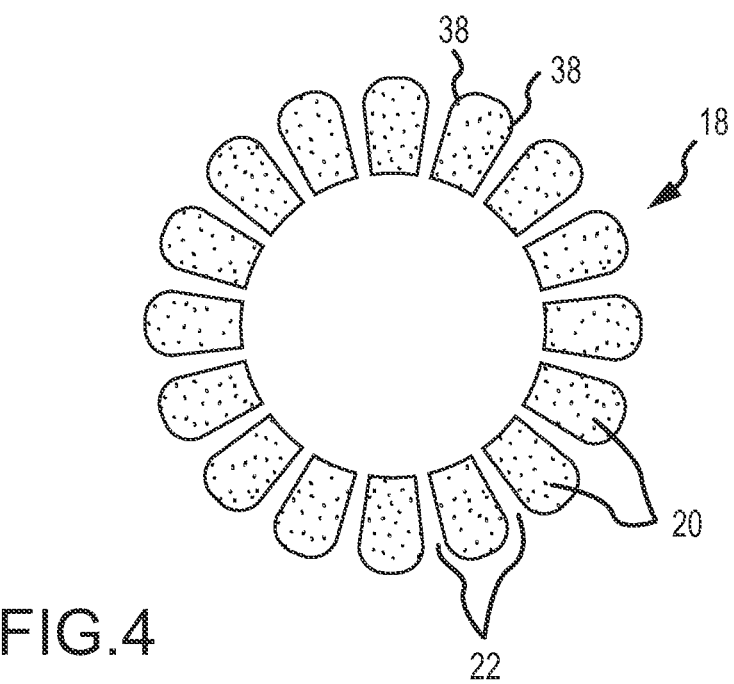
FIG. 4 is a plan view of another arrangement of friction material that can be used in the friction plate of FIG. 2.

The number of friction segments 20 forming the friction lining 18 can be optimized to provide the best compromise between cooling efficiency and load capacity. FIGS. 2 and 3 illustrate two possible aspects of the teachings for purposes of illustration and not limitation. FIG. 3 illustrates a friction lining 18 arrangement having twelve friction segments 20 and twelve grooves 22, while FIG. 4 illustrates a friction lining 18 arrangement having sixteen friction segments 20 and sixteen grooves 22.

In both of these aspects, adjacent side surfaces 21 of the grooves 22 may taper slightly inward from an outer diameter of the core plate 16 to an inner diameter of the core plate 16. The side surfaces 21 of the segments 20 can be straight, flared outward, or tapered slightly inward so that the sides surfaces of adjacent segments 20 form the inwardly tapering grooves 22. Outer edges of the friction segments 20 form an outer diameter of the friction lining 18, while inner edges of the friction segments 20 form an inner diameter of the friction lining 18. In one aspect, the width of the tapered grooves 22 may be about 5 mm at the friction lining's 18 outer diameter and about 3 mm at the friction lining's 18 inner diameter to allow oil to flow into the wet clutch 10 easily.

Also, each friction segment 20 may have rounded corners 38 at the outer edges. In one aspect of the teachings, the radii of the rounded corners are generous, on the order of millimeters. The rounded corners 38, together with the tapered side surfaces 21 forming the grooves 22, create a funnel shape 23, directing oil from the outer diameter of the core plate 16 toward the inner diameter 30 of the core plate 16 via random splashing and gravitational forces. In other words, the funnel shape formed by the friction segments 20 funnels oil into the clutch interface (i.e., between the friction plates 12 and the separator plates 14). As centrifugal forces push oil out of the wet clutch 10 during differential rotation, particularly during high-speed rotation without slippage, the rounded corners 38 guide the oil back into the clutch interface to maintain cooling action during low speed rotation with high slip speed.

As shown in FIG. 2B the friction lining 18 may also be shaped so the outer edges 33 of the friction segments 20 collectively form an outer diameter that is slightly less than the outer diameter of the core plate 16, creating a margin 44 of bare metal around the perimeter of the friction lining 18. In one aspect of the teachings, the margin 44 is approximately 1-2 mm wide. This margin 44 can improve cooling efficiency, as will be described in greater detail below.

In one aspect of the teachings, the number, shape, size, and arrangement of the friction segments 20 are selected to provide a reaction torque sufficient to provide traction if a driven wheel encounters a slip condition. In such slip conditions, the wet clutch 10 can experience high sliding speeds (e.g., greater than 500 rpm), high pressures (e.g., greater than 3 MPa), and long slip durations (e.g., greater than 5 seconds). Therefore, the friction segments 20 can be designed so the overall friction lining 18 can withstand high density power inputs (e.g., greater than 2 W/mm$^2$).

During clutch operation, heat generated by the friction lining 18 is absorbed by the core plate 16 and the separator plate 14. Thus, the interface between the friction plates 12 and the separator plates 14 can reach temperatures on the order of 400 C, which is hot enough to potentially degrade the friction lining 18. To optimize cooling, contact between the oil and both the core plate 16 and separator plate 14 should be maximized so the oil can quickly absorb retained heat in the plates 14, 16. Since splashed oil initially tends to sit on the outside of the wet clutch 10, the margin 44 increases the amount of metal contacting the oil before it is eased into the grooves 22, thereby improving cooling efficiency. Also, the margin 44 helps create surface tension that holds in the oil between the core plates 16 and the separator plates 14, prolonging the contract between the metal of the plates 14, 16 and thereby increasing the heat transfer between the hot metal of the plates 14, 16 and the oil.

It will be appreciated that the above teachings are merely exemplary in nature and is not intended to limit the present teachings, their application or uses. While specific examples have been described in the specification and illustrated in the drawings, it will be understood by those of ordinary skill in the art that various changes may be made and equivalents may be substituted for elements thereof without departing from the scope of the present teachings as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present teachings not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A friction plate for a clutch assembly, the friction plate comprising:
   a core plate having an inner diameter and a first outer diameter; and
   a plurality of friction segments made of a friction material; and
   a plurality of grooves formed by side surfaces of adjacent friction segments,
   wherein each groove continuously tapers from a first width adjacent the first outer diameter to a second width, which is smaller than the first width, adjacent the inner diameter,
   wherein the side surfaces of the adjacent friction segments are tapered from the first outer diameter to the inner diameter such that a width of each friction segment is larger at the first outer diameter than at the inner diameter, and
   wherein each friction segment has an outer edge adjacent the first outer diameter, and at least one friction segment has at least one rounded corner on the outer edge.

2. The friction plate of claim 1, wherein each of said plurality of grooves has a funnel shape.

3. The friction plate of claim 1, wherein said at least one rounded corner comprises two rounded corners on the outer edge.

4. The friction plate of claim 1, wherein each friction segment has two rounded corners on the outer edge.

5. The friction plate of claim 1, wherein each of said plurality of grooves is formed by side surfaces of adjacent friction segments such that each of said plurality of grooves is tapered.

6. The friction plate of claim 1, wherein each friction segment has an outer edge such that the combined outer edges form a second outer diameter, and wherein the second outer diameter is smaller than the first outer diameter to form a margin not covered by friction material on the core plate.

7. The friction plate of claim 1, wherein the friction material comprises at least one material selected from the consisting of paper, high-strength fibers, thermosetting resin, polyamide, carbon, and ceramic.

8. The friction plate of claim 1, wherein the friction material is one selected from a woven material, a paper-based material, a pultruded material, and a compression-molded material.

9. A clutch assembly, comprising
a plurality of friction plates, each friction plate having
a core plate having an inner diameter and a first outer diameter; and
a plurality of friction segments made of a friction material; and
a plurality of grooves formed by side surfaces of adjacent friction segments,
wherein each groove continuously tapers from a first width adjacent the outer diameter to a second width smaller than the first width adjacent the inner diameter;
wherein the side surfaces of the adjacent friction segments are tapered from the first outer diameter to the inner diameter such that a width of each friction segment is larger at the first outer diameter than at the inner diameter;
wherein each friction segment has an outer edge adjacent the first outer diameter and at least one rounded corner on the outer edge; and
a plurality of separator plates alternately disposed between said plurality of friction plates.

10. The clutch assembly of claim 9, wherein each of said plurality of grooves has a funnel shape.

11. The clutch assembly of claim 9, wherein at least one of the core plate and the separator plate are made of steel.

12. The clutch assembly of claim 9, wherein said at least one rounded corner comprises two rounded corners on the outer edge.

13. The clutch assembly of claim 9, wherein each of said plurality of grooves is formed by side surfaces of adjacent friction segments such that each of said plurality of grooves is tapered.

14. The clutch assembly of claim 9, wherein each friction segment as an outer edge such that the combined outer edges form a second outer diameter, and wherein the second outer diameter is smaller than the first outer diameter to form a margin not covered by friction material on the core plate.

15. The clutch assembly of claim 14, wherein the margin of the core plate faces the separator plate such that fluid can directly and simultaneously contact the margin of the core plate and the separator plate.

16. The clutch assembly of claim 9, wherein the friction material comprises at least one material selected from the consisting of paper, high-strength fibers, thermosetting resin, polyamide, carbon, and ceramic.

17. The clutch assembly of claim 9, wherein the friction material is one selected from a woven material, a paper-based material, a pultruded material, and a compression-molded material.

18. A friction plate for a clutch assembly, the friction plate comprising:
a core plate having an inner diameter and an outer diameter;
a plurality of friction segments provided on a surface of the core plate, each friction segment having a pair of side surfaces that form a plurality of grooves between adjacent friction segments, wherein the side surfaces of each friction segment are tapered inwardly relative to one another from the outer diameter to the inner diameter such that each friction segment has a first width adjacent the outer diameter and a second width adjacent the inner diameter that is smaller than the first width, each groove continuously tapers from a third width adjacent the outer diameter to a fourth width adjacent the inner diameter that is smaller than the third width, each friction segment has an outer edge adjacent the outer diameter, and at least one friction segment has at least one rounded corner on the outer edge.

\* \* \* \* \*

UNITED STATES PATENT AND TRADEMARK OFFICE
CERTIFICATE OF CORRECTION

| | | Page 1 of 1 |
|---|---|---|
| PATENT NO. | : 8,939,269 B2 | |
| APPLICATION NO. | : 13/328159 | |
| DATED | : January 27, 2015 | |
| INVENTOR(S) | : Bulent Chavdar and Scott T. Roth | |

It is certified that error appears in the above-identified patent and that said Letters Patent is hereby corrected as shown below:

In the Claims:

COLUMN 6, line 2 (Claim 14, line 2) "as" should be -- has --.

Signed and Sealed this
Twenty-sixth Day of May, 2015

Michelle K. Lee
*Director of the United States Patent and Trademark Office*